United States Patent [19]

Rawson

[11] Patent Number: 5,462,124
[45] Date of Patent: Oct. 31, 1995

[54] DUAL COULTER DEVICE

[75] Inventor: Ray Rawson, Farwell, Mich.

[73] Assignee: Unverferth Manufacturing Co., Inc., Kalida, Ohio

[21] Appl. No.: 114,758

[22] Filed: Sep. 1, 1993

[51] Int. Cl.$^6$ ............................ A01B 35/16; A01B 35/28
[52] U.S. Cl. .................... 172/569; 172/574; 172/659; 172/762
[58] Field of Search ................... 172/527, 569, 172/574, 576, 587, 579, 621, 624, 627, 658, 659, 660, 762; 111/165

[56] References Cited

U.S. PATENT DOCUMENTS

| 631,498 | 8/1899 | Clark | 172/576 X |
|---|---|---|---|
| 696,808 | 4/1902 | Gatling | 172/576 X |
| 781,011 | 1/1905 | Melvin | 172/658 X |
| 1,136,525 | 4/1915 | Heitbrink | 172/576 |
| 1,635,019 | 7/1927 | Walton | 172/569 |
| 1,711,071 | 4/1929 | Walker | 172/659 X |
| 2,548,261 | 4/1951 | Hester | 172/574 |
| 2,564,567 | 8/1951 | Ego | 172/569 X |
| 2,916,097 | 12/1959 | Miller | 172/569 X |
| 3,848,679 | 11/1974 | Tonsfeldt | 172/762 |
| 4,425,973 | 1/1984 | Williams et al. | 172/574 |
| 4,574,891 | 3/1986 | Williamson | 172/763 |
| 4,656,957 | 4/1987 | Williamson et al. | 172/763 X |
| 4,745,978 | 5/1988 | Williamson | 172/166 |
| 4,759,411 | 7/1988 | Williamson | 172/572 |
| 4,947,770 | 8/1990 | Johnston | 111/121 |
| 4,987,841 | 1/1991 | Rawson et al. | 111/121 |

FOREIGN PATENT DOCUMENTS

| 40735 | 8/1929 | Denmark | 172/576 |
|---|---|---|---|
| 93817 | 9/1962 | Denmark | 172/569 |
| 65716 | 3/1956 | France | 172/574 |
| 2445682 | 9/1980 | France | 172/574 |
| 7315274 | 5/1975 | Netherlands | 172/624 |

*Primary Examiner*—Randolph A. Reese
*Assistant Examiner*—Christopher J. Novosad
*Attorney, Agent, or Firm*—Henderson & Sturm

[57] ABSTRACT

A pair of coulter units arranged in a staggered relationship, each coulter unit having an upstanding shank of a height to place the shanks below a tool bar, a single, relatively flat plate disposed on a diagonal to support both shanks, and a single upstanding support member secured to the plate for mounting on the tool bar.

5 Claims, 4 Drawing Sheets

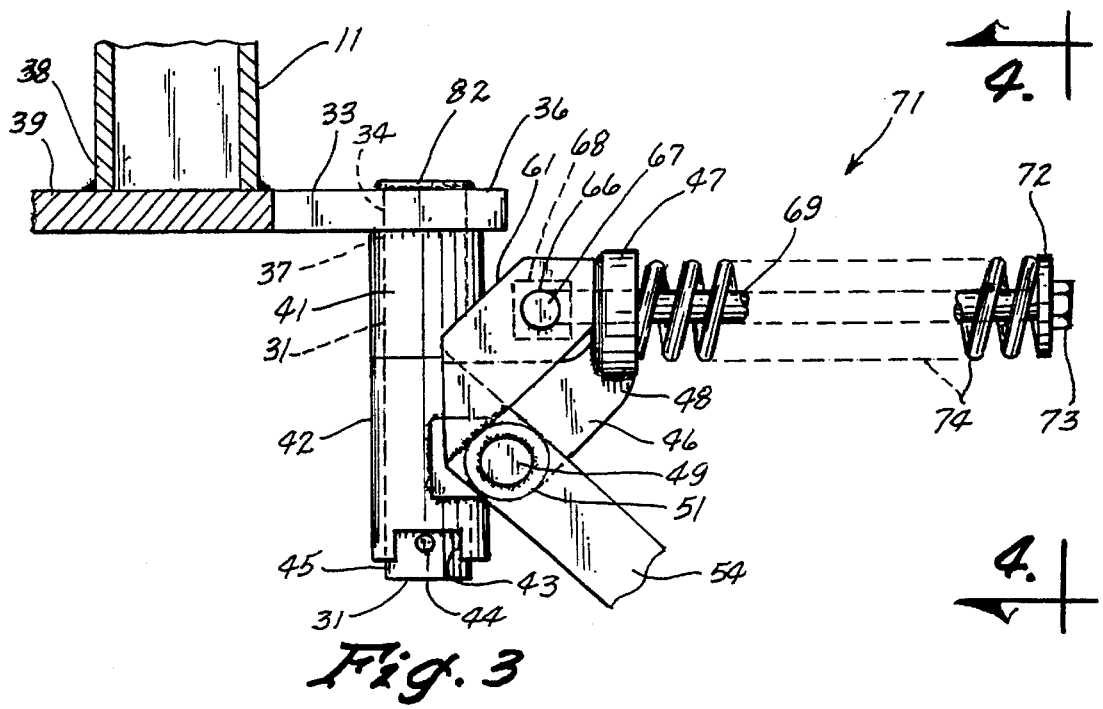
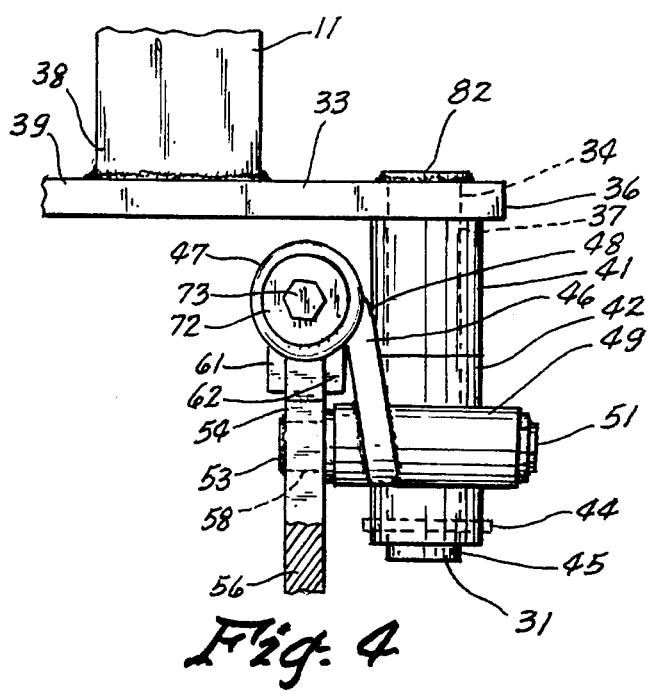

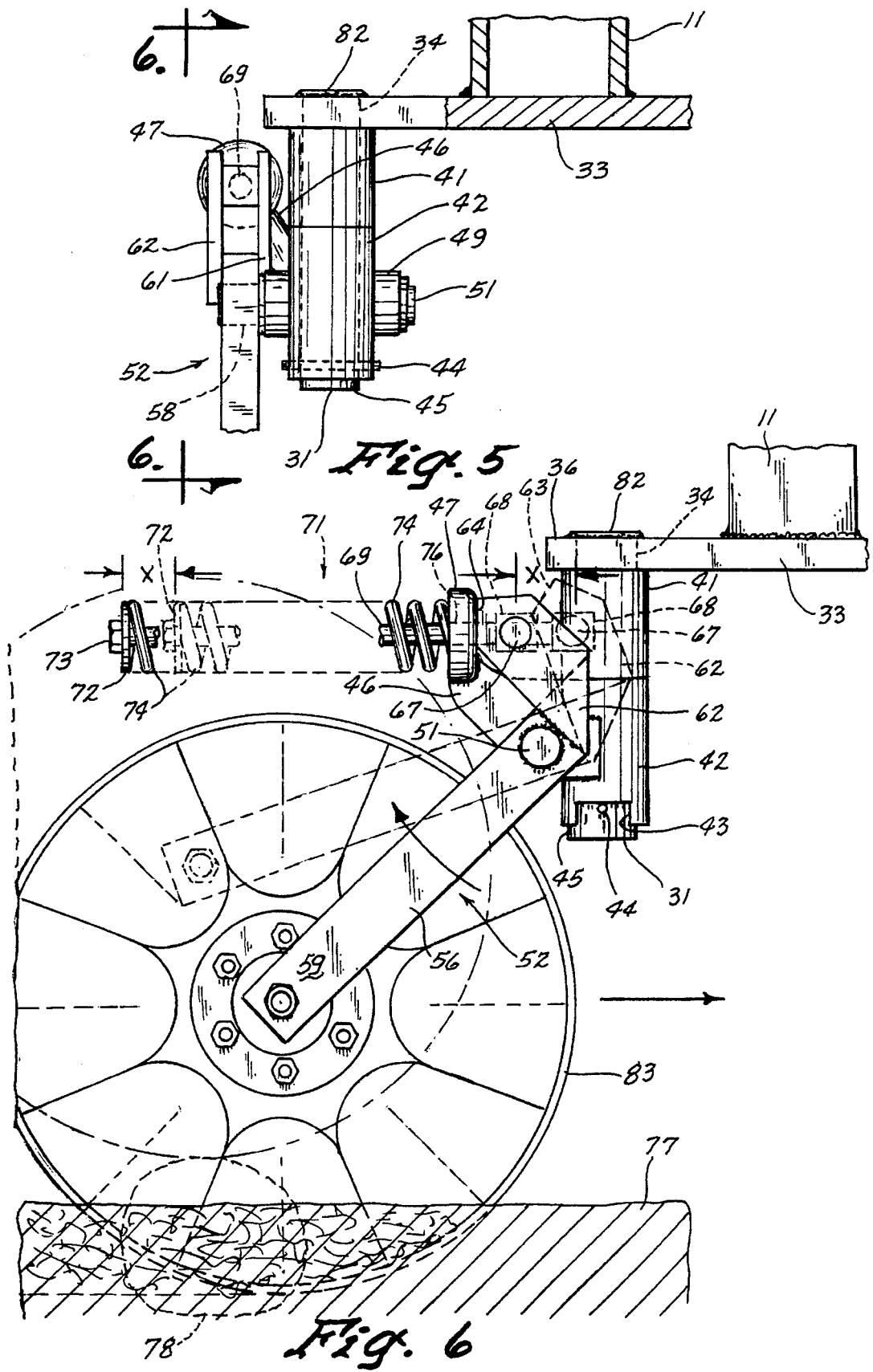

5,462,124

DUAL COULTER DEVICE

TECHNICAL FIELD

This invention relates to agricultural tillage implements, and more particularly to coulter wheel devices for tilling the soil.

BACKGROUND ART

The present invention is directed to a plurality of coulter units mounted on an agricultural tool bar, and wherein each coulter unit includes an upstanding shank secured to a tool bar, and about which each coulter is capable of pivoting for seedbed preparation. Numerous arrangements of this general type are shown in prior art U.S. Pat. Nos. 4,574,891 to Williamson; 4,656,957 to Williamson et al; 4,745,978 to Williamson; 4,759,411 to Williamson; 4,947,770 to Johnston and 4,987,841 to Rawson et al. None of these prior art structures disclose the features of the present invention.

DISCLOSURE OF THE INVENTION

The present invention is directed to an arrangement for mounting a plurality of coulter units having upstanding shanks on a tool bar, and wherein one or more mountings are eliminated for the plurality of coulter units, thus taking up less mounting space, providing for the mounting of the units to be more compact, and providing for easier mounting of the units for the operator.

The arrangement includes, for example, a trio of coulter units mounted in a triangular arrangement on fore and aft tool bars of a tool bar framework. The leading unit includes an upstanding shank which is fastened to the fore tool bar. The trailing pair of coulter units are mounted in staggered relation to each other and behind the leading coulter unit, each trailing coulter unit disposed laterally and to one side of the leading coulter unit, and with the vertical shanks of the trailing coulter units shortened and pivotally secured to a swivel plate secured to a single post, upstanding and secured to the aft tool bar.

This arrangement eliminates an upstanding shank for each lateral pair of coulter units, permitting for a preset pair of coulter units more easily and readily mountable within more confined spaces on a tool bar.

BRIEF DESCRIPTION OF THE DRAWINGS

FIG. 3 is an enlarged vertical sectional view as taken along the line 3—3 in FIG. 2;

FIG. 4 is an end elevational view as taken along the line 4—4 in FIG. 3;

FIG. 5 is a vertical sectional view as taken along the line 5—5 in FIG. 2;

FIG. 6 is an enlarged detail view of FIG. 1, and showing alternate positions of a coulter unit;

BEST MODE FOR CARRYING OUT THE INVENTION

Figure 1:
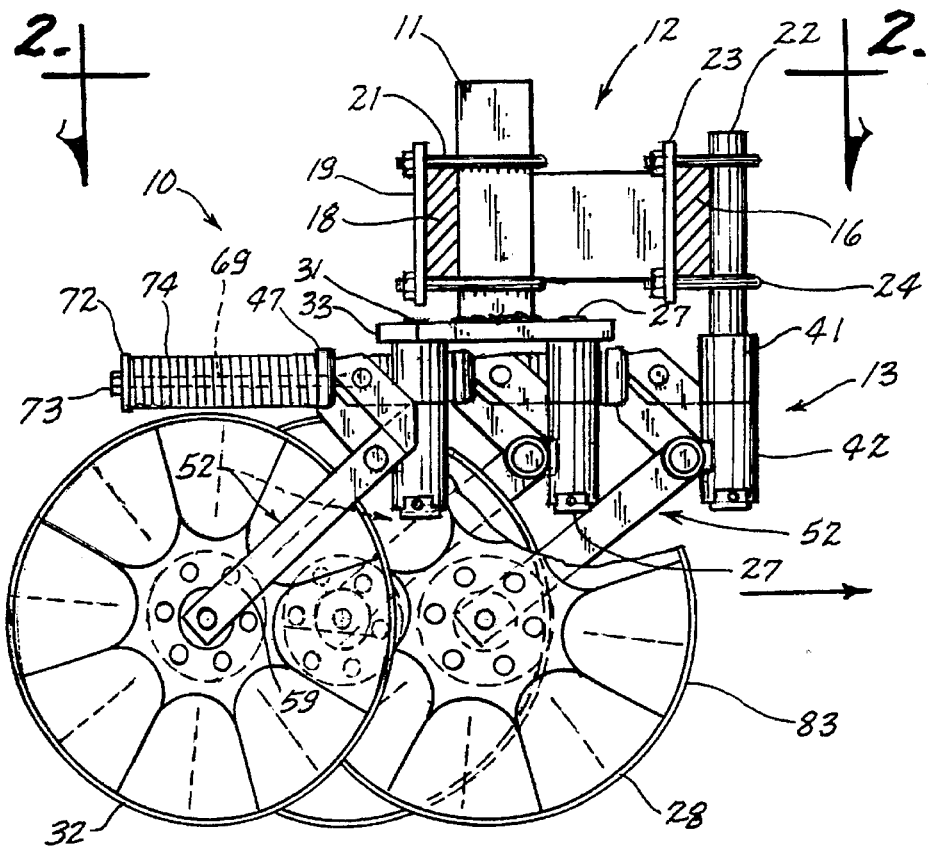
FIG. 1 is a side elevational view of a trio of coulter units mounted on a pair of fore and aft tool bars, the tool bars shown in section.

Referring now to FIG. 1 of the drawings, the dual coulter device of this invention is indicated generally at (10) as mounted by a single support post (11) to an agricultural tool bar (12) pulled by a prime mover (not shown) and which coulter device (10) may be utilized with a forward coulter unit (13) to form an assembly (14) of three coulters. This assembly has the ability as described hereinafter to place all fertilizer requirements while preparing a seedbed in no-till or conventional situations, thus eliminating the need to work the soil in most conditions several times before planting.

The tool bar (12) is conventional, including a leading, transversely extended bar (16) interconnected by a plurality of braces, one shown (17) to a trailing bar (18) disposed parallel the leading bar (16). The post (11) of the coulter device (10) is secured to the trailing bar (18) (FIG. 1) in any conventional manner, for example by a plate (19) and a pair of U-bolt fasteners (21). It will be noted further that an upstanding support shank (22) of the forward coulter unit (13) is also secured to the leading bar (16) by conventional means, such as a plate (23) and a pair of U-bolt clamps (24). Both the post (11) and the shank (22) are securely clamped in place to prevent against any movement of the post (11) or the shank (22) relative to the tool bar (12).

Figure 2:
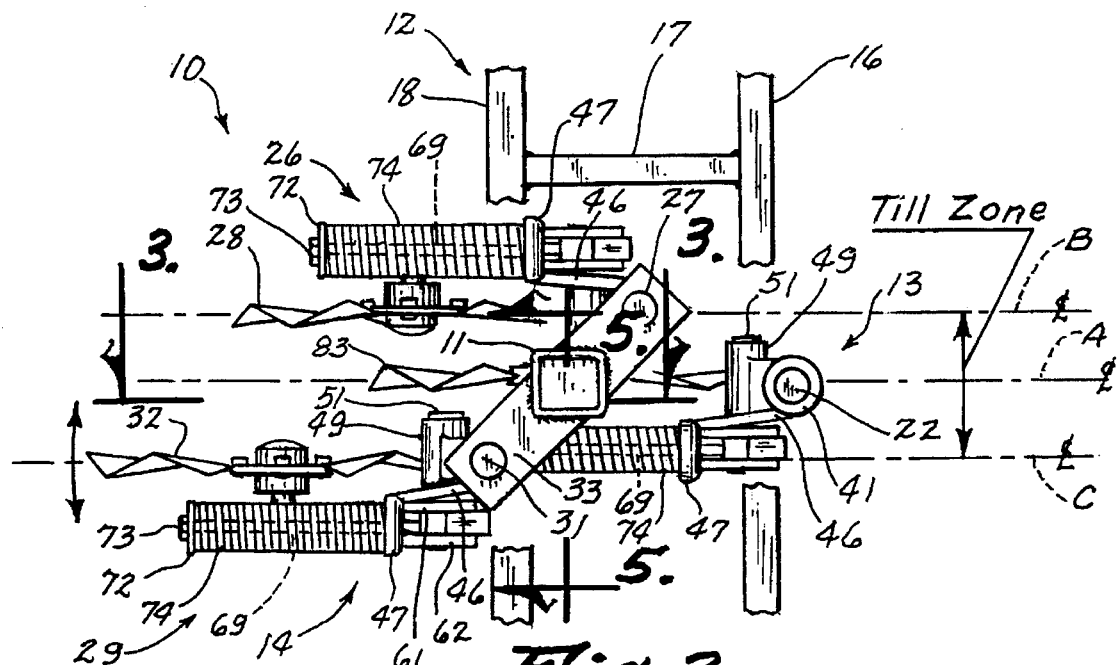
FIG. 2 is a top plan view as taken along the line 2—2 in FIG. 1.

The dual coulter device (10) comprises generally: a first coulter unit (26) (FIGS. 1 and 2) having an upstanding shank (27) on which a coulter wheel (28) is mounted for pivotal movement in a vertical plane and for limited swiveling movement in a horizontal plane; a second coulter unit (29) identical to the first coulter unit (26), again having an upstanding shank (31) on which another coulter wheel (32) is mounted for pivotal movement in a vertical plane and for limited swiveling movement in a horizontal plane; an elongated, relative flat plate (33) having an aperture (34) (FIG. 4) formed in each end (36) for receiving and supporting the upper end (37) of each shank (27), (31), respectively; and the supporting post (11) the lower end (38) of which is secured, as by welding, to the center of the upper surface (39) (FIGS. 3 and 4) of the plate (33). Referring to FIG. 2, it will be seen that the plate (33) is mounted in a horizontal plane on a diagonal relative to the direction of movement of the tool bar (see FIG. 1) whereby to place the first coulter unit (26) and the second coulter unit (29) in a staggered relationship, with the first unit (26) leading, and the second unit (29) trailing, for reasons set forth hereinafter.

Figure 7:
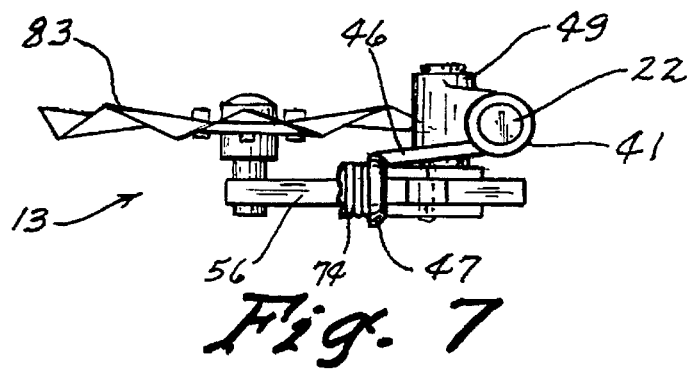
FIG. 7 is a detail, plan view of FIG. 1, showing the leading coulter unit, partially broken away.
Figure 8:
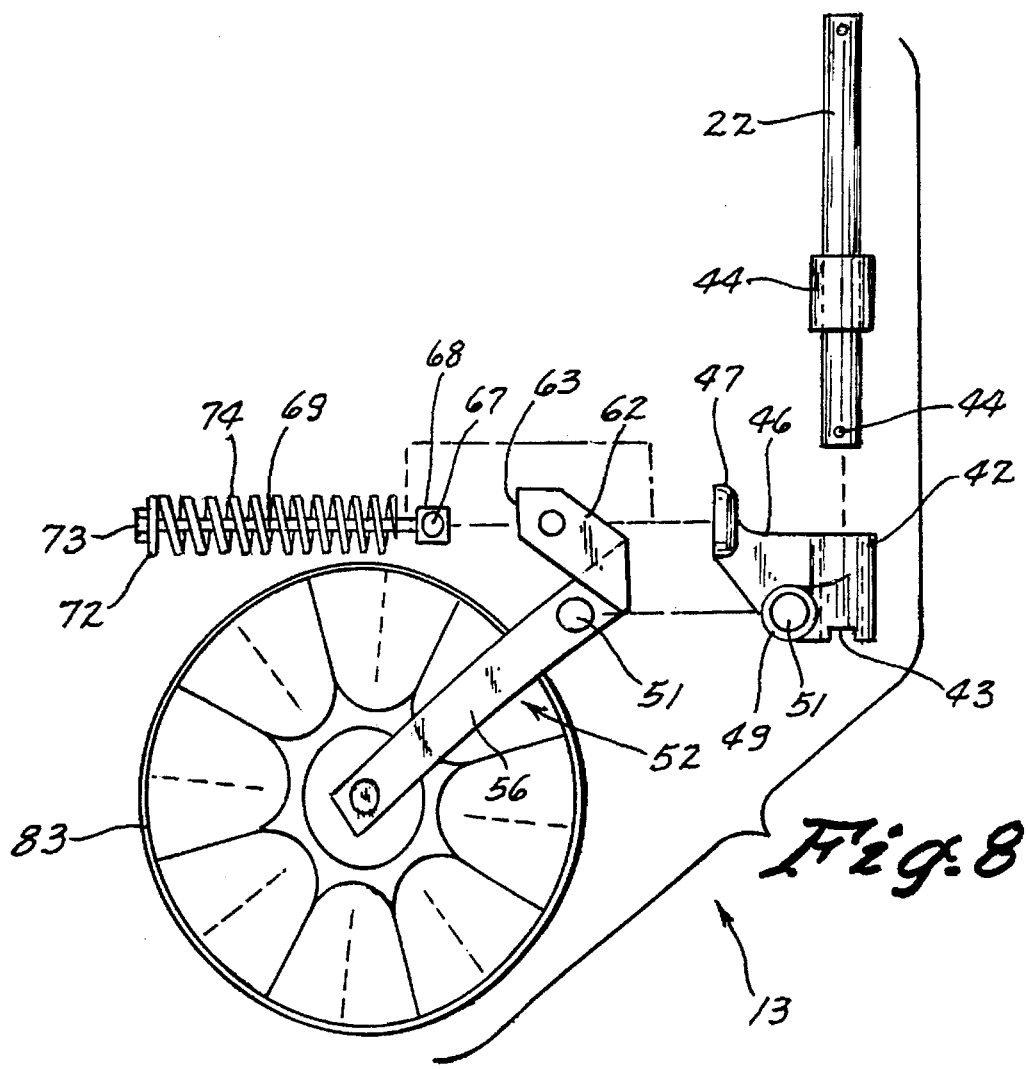
FIG. 8 is an exploded side elevational view of a coulter unit.

As the first coulter unit (26) and the second coulter unit (29) are identical, only one will be described, with like parts indicated by like reference numerals. Further, as the first and second coulter units (26) and (29) respectively, are identical to the forward unit (13) illustrated particularly in FIGS. 7 and 8, except for the shanks (22) and (27) as compared to the support shank (22) of the forward unit (13), reference to particularly FIG. 8 may be made for clarification of elements of the first and second coulter units (26), (29), respectively, again wherein like parts are indicated by like reference numerals.

The second coulter unit (29) (FIGS. 1–6) has a circular spacer (41) (FIG. 3) sized to receive the shank (31), and which spacer (41) engages at its lower end with an upper end of a mounting collar (42), the collar (42) also sized to receive and rotate about the shank (31). The spacer (41) is fixed to the shank (31). The collar (42) is freely rotatable about the shank (31), except for having a notch (43) formed at its base for engagement at either end of the notch (43) with a swivel pin (44) inserted through the bottom end (46) of the shank (31).

By this arrangement, swivelling or rotational movement of the collar (42) about the support shank (31) is limited by the extent of the notch (43). Referring to FIG. 2 wherein the second unit coulter wheel (32) is illustrated in line with the direction of travel of the coulter assembly (14), the placement of the notch (43) and pin (44) permit the coulter wheel (32) to pivot only within an acute angle to either side of the centerline line of travel, as the assembly (14) is viewed in plan.

Integral with the collar (42) is a flange (46) (FIGS. 3 and 4) extended rearwardly, upwardly and angularly to one side of the collar (42) with a retainer cup (47) mounted at the upper end (48) of the flange (46), and further integral with the collar (42) and flange (46) is a sleeve (49) secured behind the collar (42) and disposed at right angles to the extent of the collar (42). The retainer cup (47) is disposed in a vertical plane extended normal to the direction of travel of the assembly (14).

The sleeve (49) is sized to rotatably receive a shaft (51) (FIGS. 3 and 4) which shaft (51) is a part of a pivot arm unit (52) for the coulter wheel (32) of that second coulter unit (29). The shaft (51) is connected at one end (53) (FIG. 4) to an upper end (54) of a coulter swing arm (56), as by welding, the swing arm (56) having an aperture (58) (FIG. 4) formed therein for receiving the shaft end (53). The swing arm (56) is elongated (FIG. 1), having a lower end (59) adapted to rotatably mount the coulter wheel (32) in a conventional manner and being joined at the upper end (54) by a pair of shorter rocker arms (61), (62) (FIG. 4).

Referring to FIGS. 5 and 6, it is seen that the rocker arms (61), (62) are flat plates mounted on opposite sides of the swing arm upper end (54) in parallel alignment, and extend rearwardly therefrom so as to form approximate right angles with the swing arm (56). The rocker arms (61), (62) each have a rear face surface (63) (FIG. 6) adapted in one position to be engaged flush with the front face (64) of the fixed retainer cup (47), and further each rocker arm (61), (62) having an aperture (66) formed therein—the apertures (66) being transversely aligned, such as to rotatably receive a pin (67) therein.

The pin (67) is mounted in a block (68) at the forward end of a pressure rod (69), all part of a biasing unit (71) for maintaining down pressure on the coulter wheel (32). The biasing unit (71), disposed horizontally (FIGS. 3 and 6), comprises further a washer (72) held up against the locking nut (73) of the pressure rod (69) by a coil spring (74), the spring (74) held between the washer (72) at one end and the rear cup-shaped face of the retainer (47) at the other end. In this instance, the spring (74) compression is held at a pre-load, down pressure amount of approximately 1350#, but which pre-load pressure can of course be varied. Referring to FIG. 6, it will be seen that the pressure rod (69) passes through an aperture (76) formed centrally within the retainer (47), whereby spring pressure exerts a clockwise force via the pin (67) to the rocker arms (61), (62) and thence to the swing arm (56) to effect a like clockwise movement of the coulter wheel (32) into the ground (77), and of course to accept but further resist additional clockwise movement of the wheel (32) upon engagement with a rock (78) or the like, which movement pulls the rocker arms (61), (62) away from the fixed retainer cup (47) (see dotted line positions of FIG. 6).

To locate the second coulter unit (29) (FIGS. 1 and 2) as well as the first coulter unit (26) in the staggered relationship as shown and where the coulter wheels (32), (28), respectively, have a mirrored relationship, the elongated, relatively flat plate (33) (FIG. 2) is provided. The plate (33) has a pair of apertures (34) (only one shown (FIG. 3)) formed at each end to receive the upper end (82) of each shank (27), (31) of the first and second coulter units (26), (29), each upper end (82) secured, as by welding, to the plate (33). Intermediate the ends of the plate (79), the supporting post (11) is secured, as by welding, with the securement being such that when the post (11) is mounted on the trailing tool bar (18) (FIG. 2), the plate (79) is disposed, in plan, on a diagonal, about 45° from normal, relative to the direction of travel of the coulter assembly (14). Thus, with the elimination of a post or support shank for each pair of coulter units (26), (29), and with the provision of the plate (33) pre-set at a given angle for fixed locations of the first and second coulter units (26), (29) relative to each other and to the tool bar (12), a farmer-operator may more quickly and economically locate and assemble the dual coulter device (10) to his tool bar (12), and with the additional advantage of fitting both coulter units (26), (29) in a more limited space on the tool bar (12).

As mentioned hereinbefore, the forward coulter unit (13) is identical to the first and second coulter units (26), (29) with the exception of the length of the support shank (22) as compared to the much shorter shanks (27), (31), the latter disposed below the tool bar (12), and with the plate (79) also disposed below the tool bar (12) (FIG. 1). Again, the spacer (41) of the forward coulter unit shank (13) is fixed, as by welding to the shank (13); and rotation of the coulter wheel (83), the swing arm (56) and the biasing unit (71) as an assembly is limited by the extent of movement of the roll pin (44) within the notch (43) formed within the collar (42), the movement of the coulter wheel (83) being identical relative to the direction of travel and the centerline of the unit (13) as the other two coulter wheel (28), (32) movements.

In the transport mode of the assembly (14), wherein all three coulter units (13), (26) and (29) are suspended from the tool bar (12), each unit is supported by the collar (42) engaging the roll pin (44) on the respective shank, the pins (44) being of sufficient strength to accommodate such weight.

In assembly, as best shown in FIGS. 1 and 2, the forward coulter unit wheel (83) is engageable with the ground (77) for clearing residue and loosening the soil in a first path (A), the first coulter unit wheel (28) also engageable with the ground (77) for like purposes in a second path (B) offset to one side of the first path (A), with the wheel (28) staggered rearwardly from the leading wheel (83); and the second coulter unit wheel (32) is engageable with the ground (77) for like purposes in a third path (C) offset from and to an opposite side of the first path (A) as path (B), and again with the wheel (32) staggered rearwardly from the wheel (28). The offset, staggered relationship of the coulter unit wheels (28) (32) is provided by the apertures (34) at opposed ends of the plate (33) being both laterally offset and staggered fore and aft from each other relative to the normal direction of movement of the coulter assembly (14), as best shown in FIG. 2.

Although not shown herein, to apply either a liquid or a dry fertilizer substance within the area shown here being tilled (Till Zone, FIG. 2), an appropriate fertilizer applicator device may be mounted on preferably the coulter swing arm (56) of a coulter unit and extended rearwardly thereof for deposit within the soil behind or adjacent to a coulter wheel as desired. Such arrangements are shown in my co-pending application Ser. No. 07/986,969 filed Dec. 8, 1992, the disclosure of which is incorporated herein.

I claim:

1. A coulter assembly for mounting on a tool bar comprising in combination:

- a forward coulter unit including a pivotal coulter wheel engageable with the ground for clearing residue and loosening the soil in a first path, and having an upstanding shank adapted for mounting on the tool bar;
- a first coulter unit including a pivotal coulter wheel engageable with the ground for clearing residue and loosening the soil in a second path offset to one side from said first path, and having an upstanding first shank;
- a second coulter unit including a pivotal coulter wheel engageable with the ground for clearing residue and loosening the soil in a third path offset to an opposite side of said first path from said second path, and having an upstanding second shank;
- plate means secured to both said first shank and said second shank; and
- a single upright post secured to said plate means and adapted for mounting on the tool bar.

2. The invention of claim 1, and further wherein said first shank and said second shank are disposed completely below the tool bar.

3. The invention of claim 2, and further wherein said first shank and said second shank each have a height less than that of said forward coulter unit shank.

4. The invention of claim 3, and further wherein said plate means comprises an elongated relatively flat plate having a pair of apertures formed therein in spaced relationship for receiving, respectively, each said first shank and said second shank.

5. A coulter assembly for mounting on a tool bar comprising in combination:

- a first coulter unit including a pivotal wheel engageable with the ground for clearing residue and loosening soil in one path, and having an upstanding first shank;
- a second coulter unit including a pivotal coulter wheel engageable with the ground for clearing residue and loosening the soil in another path offset to one side of said one path, and having an upstanding second shank;
- plate means secured to both said first shank and said second shank;
- a single upright post secured to said plate means and adapted for mounting on the tool bar;
- and further wherein said first shank and said second shank are disposed completely below the tool bar;
- and further wherein said plate means comprises an elongated relatively flat plate having a pair of apertures formed therein in spaced relationship for receiving, respectively, each said first shank and said second shank;
- and further wherein said apertures are both laterally offset and staggered fore and aft from each other relative to the normal direction of movement of the coulter assembly.

* * * * *